(12) United States Patent
Hiromatsu

(10) Patent No.: US 7,236,265 B2
(45) Date of Patent: Jun. 26, 2007

(54) IMAGE READING APPARATUS, IMAGE FORMING SYSTEM, IMAGE READING METHOD, AND PROGRAM THEREFOR

(75) Inventor: Kenji Hiromatsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1006 days.

(21) Appl. No.: 10/285,468

(22) Filed: Nov. 1, 2002

(65) Prior Publication Data
US 2003/0099000 A1  May 29, 2003

(30) Foreign Application Priority Data
Nov. 27, 2001  (JP) .............................. 2001-361056

(51) Int. Cl.
*G06F 15/00* (2006.01)
*H04N 1/46* (2006.01)
*G03F 3/08* (2006.01)

(52) U.S. Cl. ........................ 358/1.9; 358/514; 358/529

(58) Field of Classification Search ................. 358/1.9, 358/518, 509, 514, 523, 529, 413, 475, 504; 382/162, 167, 319
See application file for complete search history.

(56) References Cited

U.S. PATENT DOCUMENTS

| | | | | |
|---|---|---|---|---|
| 4,644,403 A | * | 2/1987 | Sakai et al. ................. | 348/298 |
| 5,070,414 A | * | 12/1991 | Tsutsumi .................... | 358/466 |
| 5,703,696 A | * | 12/1997 | Sakai et al. ................. | 358/404 |
| 5,726,779 A | * | 3/1998 | Kadowaki et al. .......... | 358/520 |
| 5,748,335 A | * | 5/1998 | Honma et al. .............. | 358/445 |
| 5,926,579 A | * | 7/1999 | Uejo et al. .................. | 382/272 |
| 5,940,125 A | * | 8/1999 | Suganuma ................... | 348/243 |
| 5,946,112 A | * | 8/1999 | Kobayashi .................. | 358/518 |
| 6,084,634 A | * | 7/2000 | Inagaki et al. .............. | 348/294 |
| 6,118,895 A | * | 9/2000 | Hirota et al. ................ | 382/165 |
| 6,121,994 A | * | 9/2000 | Kuribayashi et al. ....... | 347/237 |
| 6,337,713 B1 | * | 1/2002 | Sato ............................ | 348/311 |
| 6,700,609 B1 | * | 3/2004 | Abe ............................ | 348/243 |

(Continued)

FOREIGN PATENT DOCUMENTS

JP     02-224467     9/1990

(Continued)

OTHER PUBLICATIONS

U.S. Appl. No. 10/021,246, filed Sep. 19, 2001.

(Continued)

*Primary Examiner*—Madeleine A V Nguyen
(74) *Attorney, Agent, or Firm*—Fitzpatrick, Cella, Harper & Scinto

(57) ABSTRACT

An image reading apparatus includes an imaging unit which has a plurality of channels and which, for the channels, outputs effective signals output from photo-receiving sections for receiving light from a subject, and optical black signals output from light-shielding sections in which the light from the subject is shielded. The image reading apparatus also includes a monitoring unit for monitoring the optical black signal output from the imaging unit, a correcting unit for performing shading correction on the signals output from the imaging unit, and a controller for controlling timing with which the shading correction by the correcting unit is performed. In an image reading method for the apparatus, the shading correction is performed in response to a job start signal, and based on an optical black signal monitored thereafter, the shading correction is performed again.

26 Claims, 12 Drawing Sheets

U.S. PATENT DOCUMENTS 6,721,009 B1 * 4/2004 Iizuka ................. 348/314
6,791,615 B1 * 9/2004 Shiomi et al. ............ 348/323
7,050,098 B2 * 5/2006 Shirakawa et al. ....... 348/245

FOREIGN PATENT DOCUMENTS

| JP | 02-254855 | 10/1990 |
|---|---|---|
| JP | 05-236274 | 9/1993 |
| JP | 09-163077 | 6/1997 |
| JP | 2001-223895 | 8/2001 |

OTHER PUBLICATIONS

U.S. Appl. No. 10/267,643, filed Oct. 10, 2002.

* cited by examiner

IMAGE READING APPARATUS, IMAGE FORMING SYSTEM, IMAGE READING METHOD, AND PROGRAM THEREFOR

BACKGROUND OF THE INVENTION

1. Field of the Invention

The present invention relates to an image reading apparatus using a plurality of sensor chips, an image reading method, and a program used therefor.

2. Description of the Related Art

In scanners for use by common users, contact image sensors (CISs) are used since they have advantages in that the required cost is reduced by the recent progress in the semiconductor process and production technology and in that they only need small amounts of luminous energy from light sources.

Recent scanners for use by common users have a main-scanning period of approximately 10 to 20 milliseconds, while image reading apparatuses, which are so-called "copying machines", have such a two-digit increase in speed that the main-scanning period is 300 milliseconds.

When a CIS is used in the image reading apparatus having the double speed, one problem is that an increase in the temperature of sensor chips causes variation in a black offset level, which is a signal level for performing correction, to a reference level for the black signal by performing calculation on input signals and which can cancel (offsets) a difference in level between input signals. Specifically, in a mode of sequential reading of up to approximately fifty documents by using an auto document feeder (ADF), shading correction for offsetting an effective-image-signal level difference (e.g., a level difference between image signals in a line sensor when performing reading from a uniform-density reference member) is performed only once at the start of a job (e.g., an image-reading operation based on an operator's instruction). This is because mechanical implementation of shading correction for each document reduces copying productivity. Also, in order to meet the recent need to reduce power consumption, there is a case in which a CIS is not supplied with power when scanning is not performed, and by supplying power just before scanning, tens of documents are consecutively copied.

In this case, the temperature of a sensor chip and an analog chip rapidly rises for about the first one minute from a dead state and gradually increases thereafter, so that the black offset level changes. In addition to self-heating of the sensor chip and the analog chip, for example, when a Xenon lamp or the like is used as a document-illuminating light source, it is also a heat source and enhances the change.

As described above, the above-described related art has several problems. For example, it takes three minutes to sequentially read fifty documents set in the ADF from the start of reading to the end of reading, and the black offset level greatly changes between the reading of the first document and the reading of the fiftieth document.

This becomes particularly serious when a so-called "multi-chip sensor" formed by a plurality of arranged sensor chips is used. In other words, the change in black offset level between chips is not uniform compared with individual sensor-chip differences. Accordingly, a plurality of channels have different reference levels for a black signal. This generates brightness differences in image regions corresponding to the reference levels, so that visual image quality greatly deteriorates.

SUMMARY OF THE INVENTION

The present invention has been made in consideration of the problems described above, and an object thereof is to suppress large deterioration in visual image quality which is caused by brightness differences in image regions.

According to one aspect of the present invention, the foregoing object is attained by providing an image reading apparatus including: an imaging unit having a plurality of channels, the imaging unit outputting effective signals from photo-receiving sections, and optical black signals from light-shielding sections; a monitoring unit which monitors the optical black signal output from the imaging unit; a correcting unit which performs shading correction on the signals output from the imaging unit; and a controller which controls timing with which the shading correction by the correcting unit is performed. The controller performs control so that the shading correction is performed in association with a job-start signal, and performs, based on the optical black signals monitored thereafter, control so that the shading correction is performed again.

According to another aspect of the present invention, the foregoing object is attained by providing an image reading apparatus including: an imaging unit having a plurality of channels, the imaging unit outputting effective signals from photo-receiving sections, and optical black signals from light-shielding sections; a signal correcting unit which corrects the effective signals for the channels; and a controller which controls the imaging unit to output, with predetermined timing, the signals for correction by the signal correcting unit. The predetermined timing is the time that a predetermined value is reached by a level difference for each of the channels between a first optical black signal output for each of the channels from the light-shielding section and a second optical black signal output after the first optical black signal is output.

According to another aspect of the present invention, the foregoing object is attained by providing an image reading system including an image reading apparatus, and a signal processing unit which performs signal processing on an input signal which is output from the image reading apparatus. The image reading apparatus includes: an imaging unit which has a plurality of channels and which outputs effective signals from photo-receiving sections, and optical black signals from light-shielding sections; a signal correcting unit which corrects the effective signals for the channels; and a controller which controls the imaging unit to output, with predetermined timing, the signals for correction by the signal correcting unit. The predetermined timing is the time that a predetermined value is reached by a level difference for each of the channels between a first optical black signal output for each of the channels from the light-shielding section and a second optical black signal output after the first optical black signal is output.

According to another aspect of the present invention, the foregoing object is attained by providing an image reading method with the use of an image reading apparatus. The image reading apparatus includes: an imaging unit which has a plurality of channels which output, for the channels, effective signals from photo-receiving sections, and output optical black signals from light-shielding sections; a monitor unit which monitors the optical black signals output from the light-shielding sections; and a shading correction unit which performs shading correction on the signals output from the imaging unit. The method includes correcting the shading in response to a job-start signal, and correcting again the shading based on the optical black signals monitored.

According to another aspect of the present invention, the foregoing object is attained by providing an image reading method with the use of an image reading apparatus. The image reading apparatus includes: an imaging unit which has a plurality of channels and which output effective signals from photo-receiving sections, and output optical black signals from light-shielding sections; a signal correcting unit which corrects the effective signals for the channels; and a controller which controls the imaging unit to output, with predetermined timing, the signals for correction by the signal correcting unit. The method includes outputting a second optical black signal, after the first optical black signal is output, from said imaging unit with timing which is the time that a predetermined value is reached by a level difference for each of the channels between a first optical black signal output for each of the channels from said light-shielding section, and outputting the signals.

According to another aspect of the present invention, the foregoing object is attained by providing a computer program product including a computer-usable medium having computer-readable program-code means embodied in the computer-usable medium for controlling an image reading apparatus including: an imaging unit which has a plurality of channels and which output effective signals from photo-receiving sections and output optical black signals from light-shielding sections; a monitor unit which monitors the optical black signals output from the light-shielding sections; and a shading correction unit which performs shading correction on the signals output from the imaging unit. The computer program product includes a computer-readable program-code means for performing shading correction in response to a job-start signal, and for, based on the optical black signals monitored thereafter, performing the shading correction again.

According to another aspect of the present invention, the foregoing object is attained by providing a computer program product including a computer-usable medium having computer-readable program-code means embodied in the computer-usable medium for controlling an image reading apparatus including: an imaging unit which has a plurality of channels and which output effective signals from photo-receiving sections and output optical black signals from light-shielding sections; a signal correcting unit which corrects the effective signals for the channels; and a controller which controls the imaging unit to output, with predetermined timing, the signals for correction by the signal correcting unit. The computer program product includes a computer-readable program-code means for causing the imaging unit to output the signals for correction with timing which is the time that a predetermined value is reached by a level difference for each of the channels between a first optical black signal output for each of the channels from the light-shielding section and a second optical black signal output after the first optical black signal is output.

Further objects, features and advantages of the present invention will become apparent from the following description of the preferred embodiments with reference to the attached drawings.

BRIEF DESCRIPTION OF THE DRAWINGS

The accompanying drawings, which are incorporated in and constitute a part of the specification, illustrate embodiments of the present invention, and together with the description, serve to explain the principles of the present invention.

DESCRIPTION OF THE PREFERRED EMBODIMENTS

Preferred embodiments of the present invention will be described in detail in accordance with the accompanying drawings.

First Embodiment

A first embodiment of the present invention is fully described below with reference to the accompanying drawings.

Figure 1:
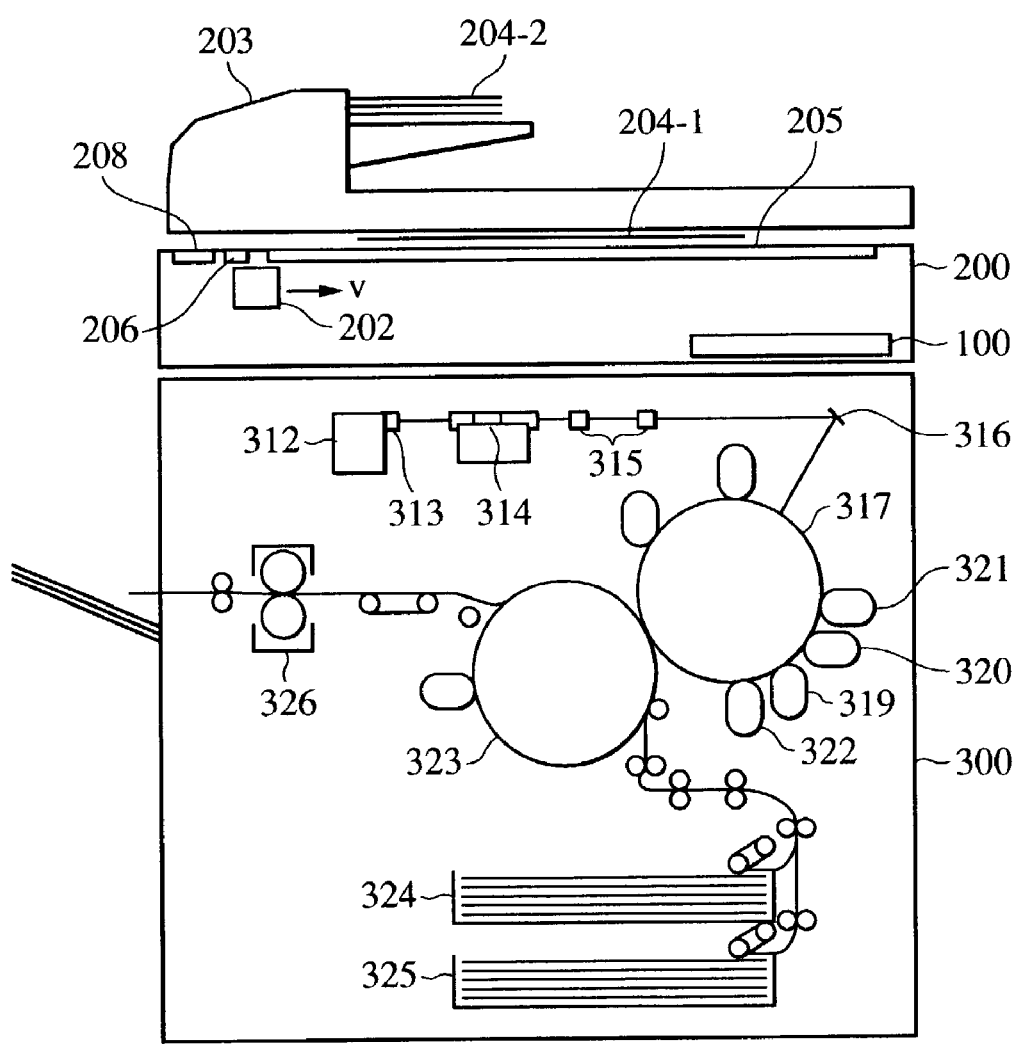
FIG. 1 is a block diagram showing an image forming apparatus according to a first embodiment of the present invention.

FIG. 1 is an illustration of the sectional structure of an image forming apparatus according to the first embodiment of the present invention. In FIG. 1, an image scanner unit 200 reads an original document and performs digital signal processing. A printer unit 300 outputs in a full-color printed form an image corresponding to the image of the document read by the image scanner unit 200.

A CIS module 202 for use in the first embodiment is described below with reference to FIG. 2.

Figure 2:
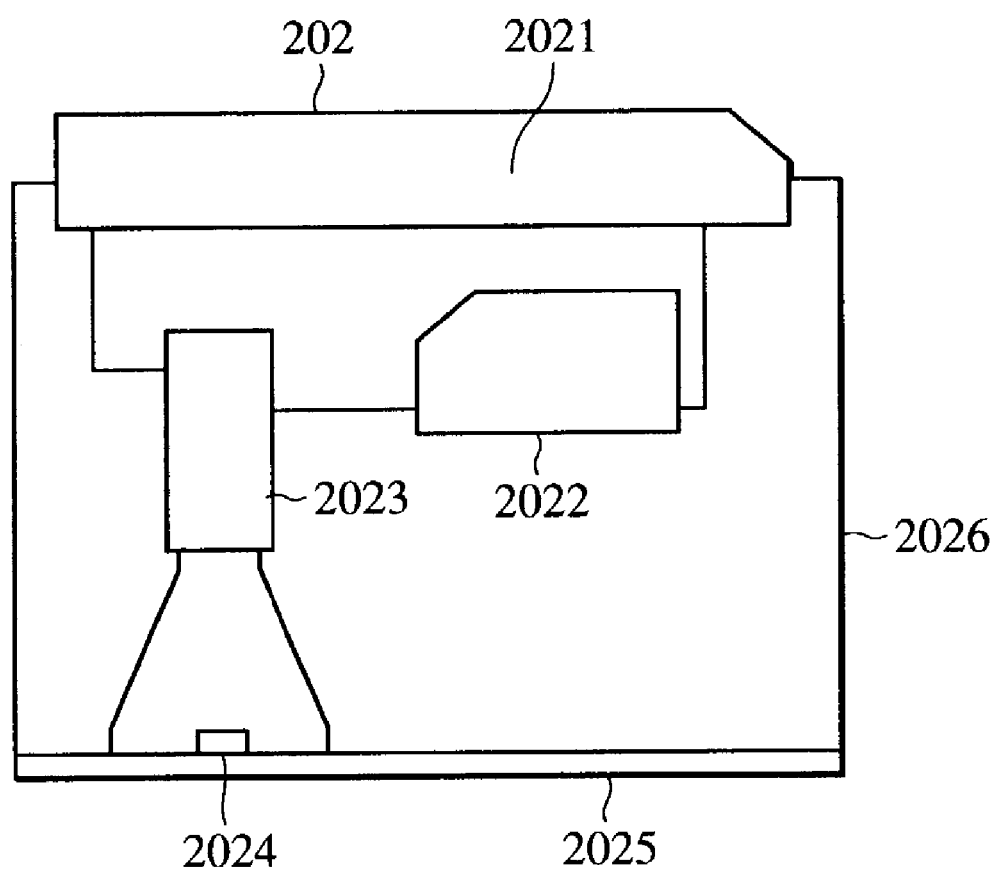
FIG. 2 is a sectional view showing a CIS module 202 in the first embodiment of the present invention.
Figure 3:
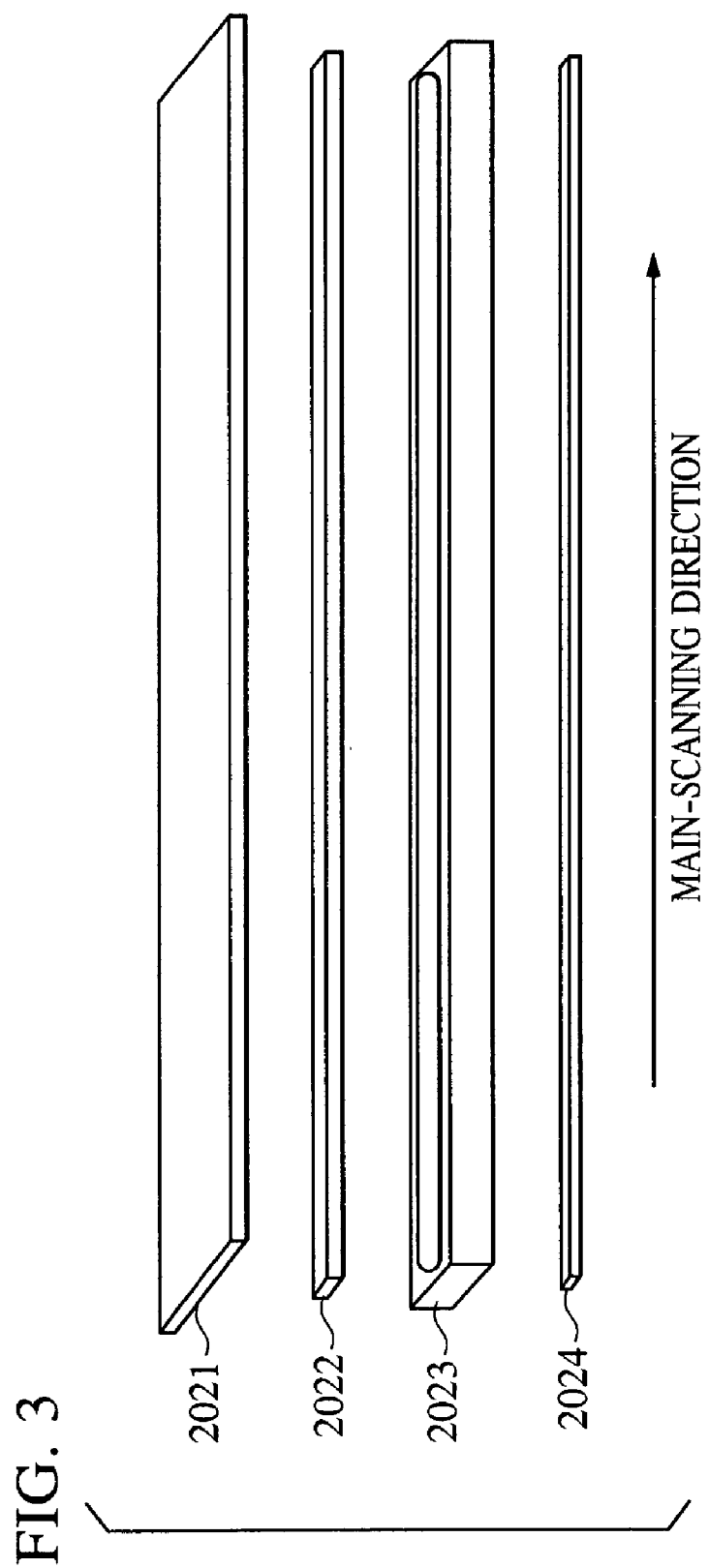
FIG. 3 is a perspective view showing the structure of the CIS module 202 in the first embodiment of the present invention.

FIG. 2 is a sectional view of the CIS module 202, which is taken along the longitudinal direction (a main-scanning direction) of the CIS module 202. As shown in FIG. 2, the CIS module 202 has the following structure. Specifically, a cover glass 2021, a light source 2022 including light-emitting diodes (LEDs), a 1-magnification imaging lens 2023 formed by a selfoc lens or the like and, a color line sensor 2024 are mounted on a base 2025. The CIS module 202 is assembled by joining these components to a mold 2026. Also, FIG. 3 is a perspective view of the structure in FIG. 2.

Figure 4:
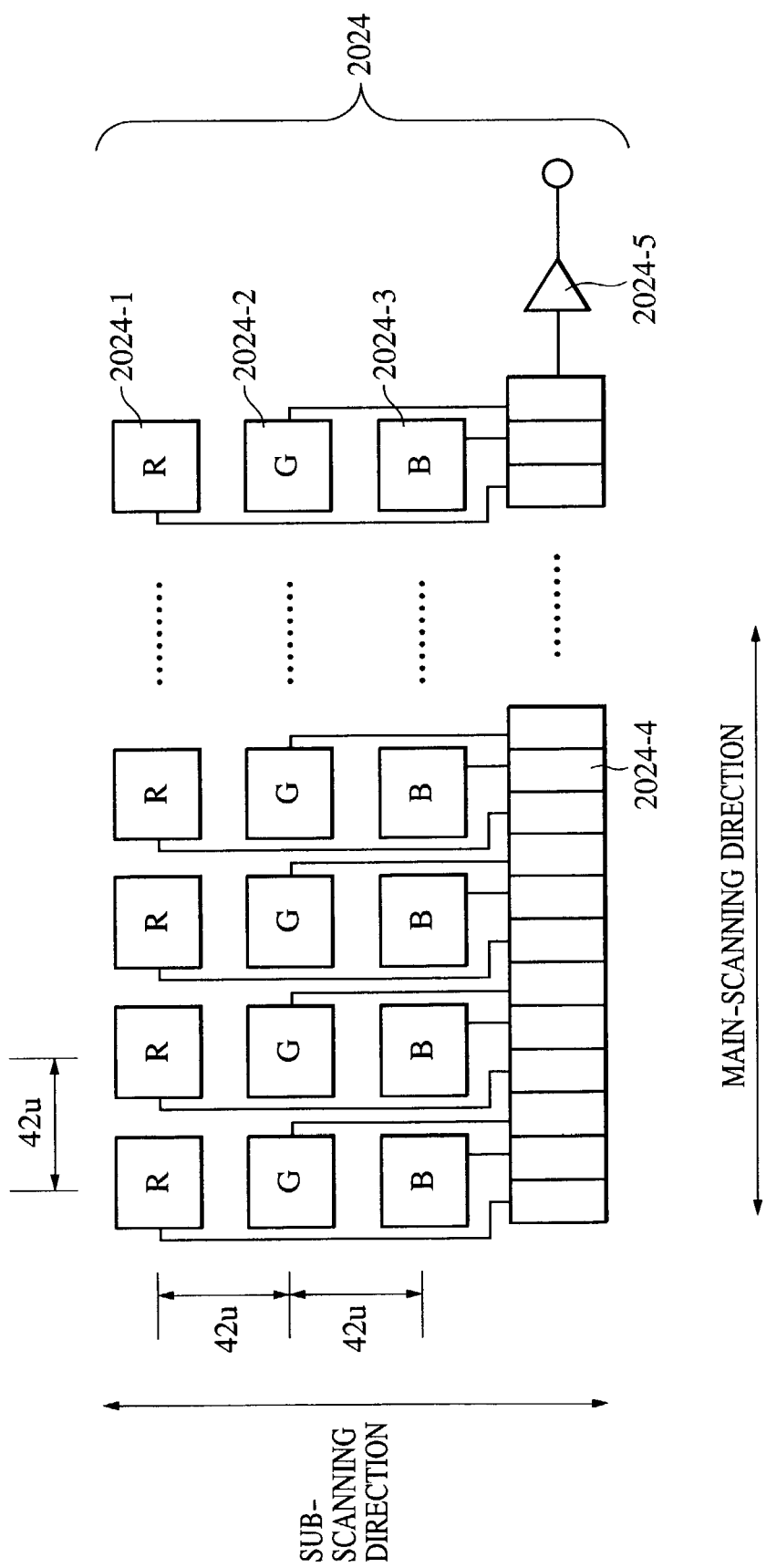
FIG. 4 is an illustration of the microscopic structure of the CIS module 202 in the first embodiment of the present invention.

FIG. 4 is an enlarged illustration of a microscopic portion of the color line sensor 2024 in the CIS module 202. The color line sensor 2024 includes a photo-receiving-device row (photosensor) 2024-1 for receiving the wavelength component of red (R) light, a photo-receiving-device row 2024-2 for receiving the wavelength component of green (G) light, and a photo-receiving-device row 2024-3 for receiving the wavelength component of blue (B) light. Accordingly, on the R-photosensor 2024-1, an R-filter (not shown) through which the wavelength component of R-color in visible light is allowed to pass is disposed. Similarly, a G-filter (not shown) is disposed on the G-photosensor 2024-2, and a B-filter (not shown) is disposed on the B-photosensor 2024-3.

In FIG. 4, each of the RGB squares indicates a reading pixel in an effective region that outputs an effective pixel signal by receiving light in a photo-receiving section as a photo-receiving means. Since this is a CIS module for 600-dpi 1-magnification reading, the size of one pixel is 42×42 μm².

The above three different photo-receiving-device rows have a monolithic structure on the same silicon chip so that the RGB photosensors are disposed in parallel to one another so as to read a single line on the original document. The structure is constituted by the photo-receiving-device rows 2024-1, 2024-2, and 2024-3 (photodiodes on which the three-primary-color filters are formed) as reading aperture pixels, and each set of three (RGB) reading lines are arranged at intervals of 42 μm in a sub-scanning direction. The pixel pitch in the main-scanning direction is also 42 μm. The photosensors in the aperture generate electric charges in proportion to the amount of incident light during a storage time.

An electric charge transfer unit 2024-4 transfers electric charges to the analog signal processor 101 (FIG. 6) as follows. Specifically, by supplying a shift pulse with timing corresponding to the start of one line, electric charges are moved from the pixel rows in the aperture 2024-1, 2024-2, and 2024-3 to the charge transfer unit 2024-4. After being transferred to the charge transfer unit 2024-4, the charges are time-divisionally transferred to an output amplifier 2024-5 in the order of G, B, R, G, B, R, . . . in sequence with the timing of receiving transfer clocks. After converting the charges into voltages, the output amplifier 2024-5 outputs signals as voltage outputs in the order of G, B, R, G, B, R, . . . In addition, light is shielded in pixels (not shown), and a so-called "optical black (OB)" unit that outputs a reference signal for offsetting based on shading correction (described later) is formed for each chip.

Figure 5:
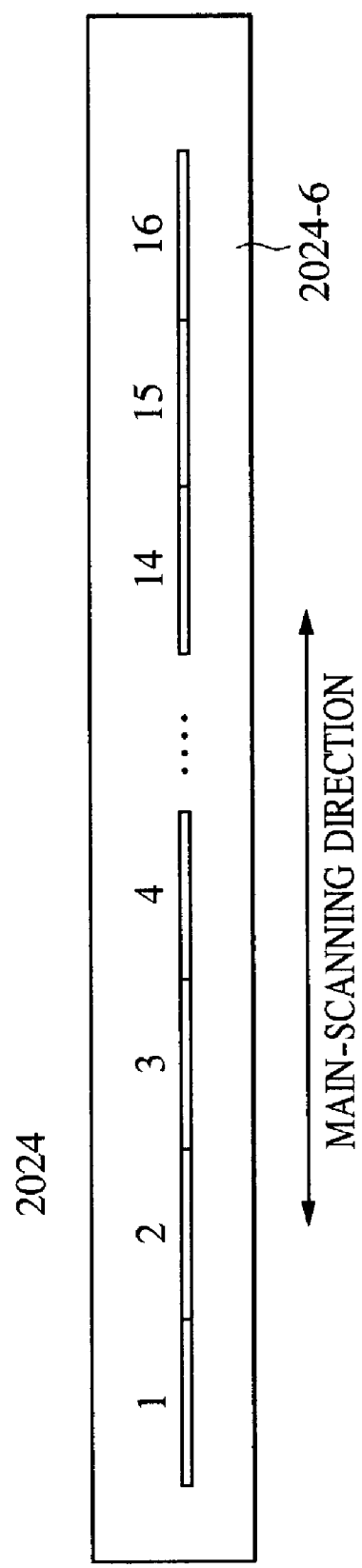
FIG. 5 is an illustration of the macroscopic structure of the CIS module 202 in the first embodiment of the present invention.

FIG. 5 is a macroscopic view of the color-line-sensor unit 2024. The color-line-sensor unit 2024 is formed such that sixteen CCD chips as sensor chips are linearly mounted on a base 2024-6. Since the chips output signals, sixteen-channel signals are simultaneously read corresponding to the chips. Each of the chips has an OB unit, as described above. In the first embodiment, channels are provided in units of chips. Accordingly, OB signals and effective pixel signals can be output from the sixteen channels.

Figure 6:
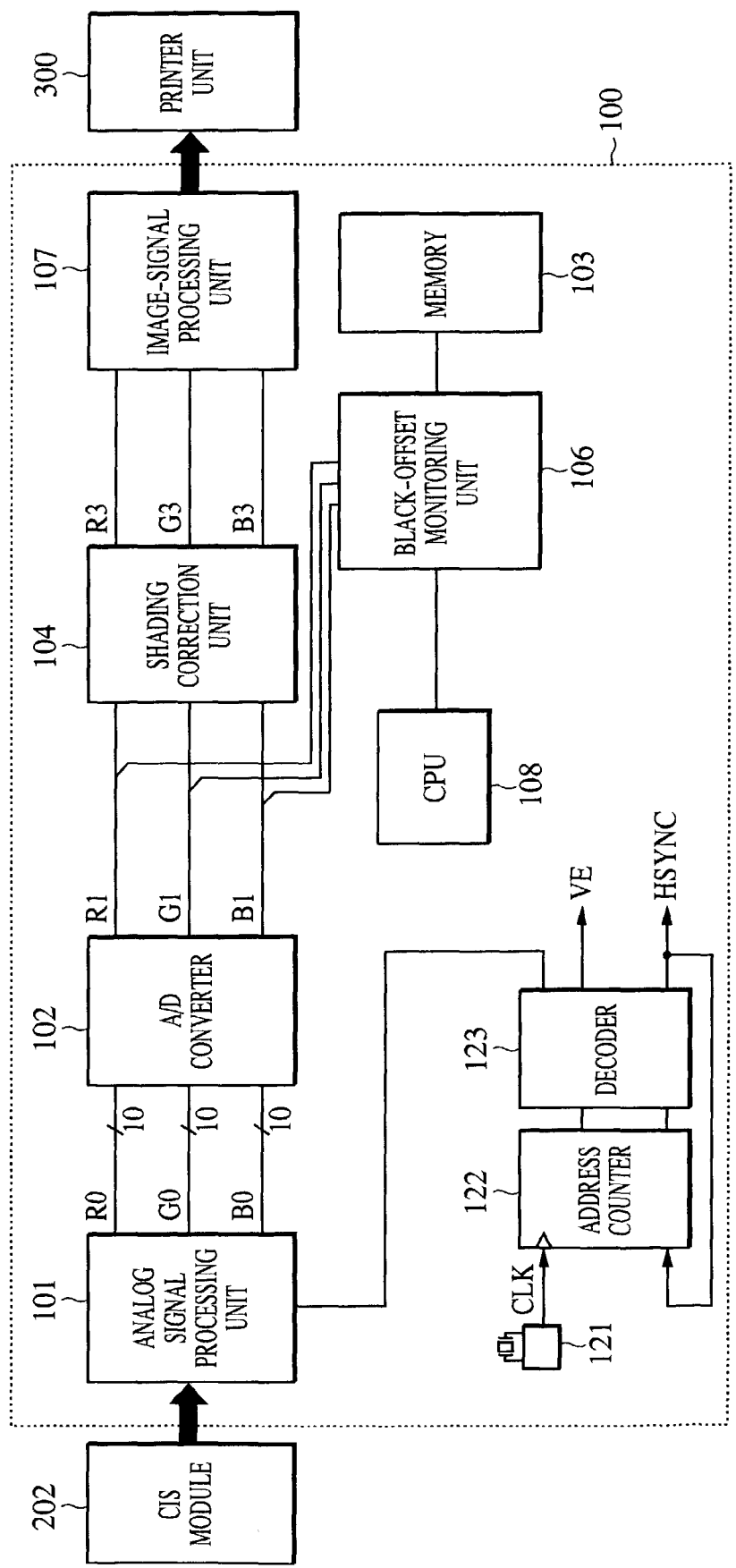
FIG. 6 is a block diagram showing a central processing unit 108 as an image signal processor 100 in the first embodiment of the present invention.

The sixteen-channel signals are processed based on a gain-offset adjustment by an analog signal processor 101 (FIG. 6), and the processed signals are converted into digital signals by an analog-to-digital (A/D) converter 102 (FIG. 6).

Here, as shown in FIG. 1, in the ADF unit 203 of an image scanner unit 200, a document 204-1 set on a document-table glass (platen) 205 is exposed to light from the light source 2022 in the CIS module 202 (FIG. 2). Light reflected by the document 204-1 passes through the imaging lens 2023 to form an image on the color-line-sensor unit 2024 (FIG. 2).

Also, by moving the CIS module 202 to a continuous-reading glass 208, documents 264-2 can be consecutively supplied for reading from the ADF unit 203.

The color-line-sensor unit 2024 reads RGB components from full color information by performing color separation on light information from the document. The color-line-sensor unit 2024 sends the RGB components to a signal processor 100 (FIG. 6). Each of the line-sensor rows in the color-line-sensor unit 2024, which read signals corresponding to color components, consists of 7500 pixels. In this structure, an A3-size document, the maximum document size which can be set on the document-table glass 205, can be read in the lateral length of 297 mm with a resolution of 600 dpi.

The CIS module 202 scans the entire surface of the document 204-1 by mechanically moving in a direction (hereinafter referred to as a "sub-scanning direction") perpendicular to its electric scanning direction (hereinafter referred to as a "main-scanning direction") at a speed V (FIG. 1).

By reading the reflected light from a standard white member 206 as a density reference, correcting data is generated for data read by the RGB sensors 2024-1 to 2024-3 formed on the color-line-sensor unit 2024. The standard white member 206 exhibits almost uniform reflection characteristics in visible light and has white color in visible light. In the first embodiment, by using the standard white member 206, output data from the RGB sensors 2024-1 to 2024-3 are corrected.

An image-signal processing unit 107 (FIG. 6) uses electric processing to decompose the read signals into magenta (M), cyan (C), yellow (Y), and black (Bk) components, and sends the components to the printer unit 300 (FIG. 6). In the first embodiment, whenever the document 204-1 is scanned in the image scanner unit 200, among the M, C, Y, and Bk components, one component is sent to the printer unit 300, and photocopying printout is completed.

In the printer unit 300, image signals corresponding to the M, C, Y, and Bk components are sent from the image scanner unit 200 to the image signal processor 100 and then to a laser driver 312. In response to the image signals, the laser driver 312 drives a semiconductor laser 313 so that its laser beam is modulated. The laser beam passes through a polygon mirror 314, an f-θ lens 315, and a mirror 316 to scan a photosensitive drum 317.

A developer includes a magenta developer 319, a cyan developer 320, a yellow developer 321, and a black developer 322. These four developers alternately touch the photosensitive drum 317 and develop electrostatic latent images of M, C, Y, and Bk colors with corresponding toners. An image-transfer drum 323 winds a sheet of paper supplied from paper trays 324, 325 around the image-transfer drum 323, and transfers the toner images developed on the photosensitive drum 317 onto the sheet.

After the toner images of the M, C, Y, and Bk colors are sequentially transferred as described above, the sheet is discharged through a fixing unit 326.

Next, the image signal processor 100 is described below.

FIG. 6 is a block diagram showing the flow of image signals in the image signal processor 100 in the image scanner unit 200 in the first embodiment. The shown blocks are controlled by a central processing unit (CPU) 108 as a control means. Specifically, as shown in FIG. 6, signals output by the CIS module 202 are input to an analog signal processing unit 101 and are processed so that gain adjustment and offset adjustment (cancellation by a clamp circuit or the like of a level difference between analog signals) are performed. After that, the processed signals are converted for the RGB colors into 10-bit digital image signals R1, G1, and B1.

Next, the digital image signals R1, G1, and B1 are input to a shading correction unit 104, and for each digital image signal, shading correction using a read-enable signal from the standard white member 206 (FIG. 1) as a reference-density member is performed. A clock generator 121 generates clocks in units of pixels. A main-scanning address counter 122 counts the clocks from the clock generator 121, and generates pixel address outputs for one line. A decoder 123 decodes a main-scanning address from the main-scanning address counter 122, and generates line-unit sensor-driving signals such as a shift pulse and a reset pulse, a VE signal representing an effective signal region in a 1-line read signal from the CIS module 202, and a line synchronizing signal HSYNC. The main-scanning address counter 122 is cleared based on the line synchronizing signal HSYNC and initiates counting on the main-scanning address of the next line.

Figure 7:
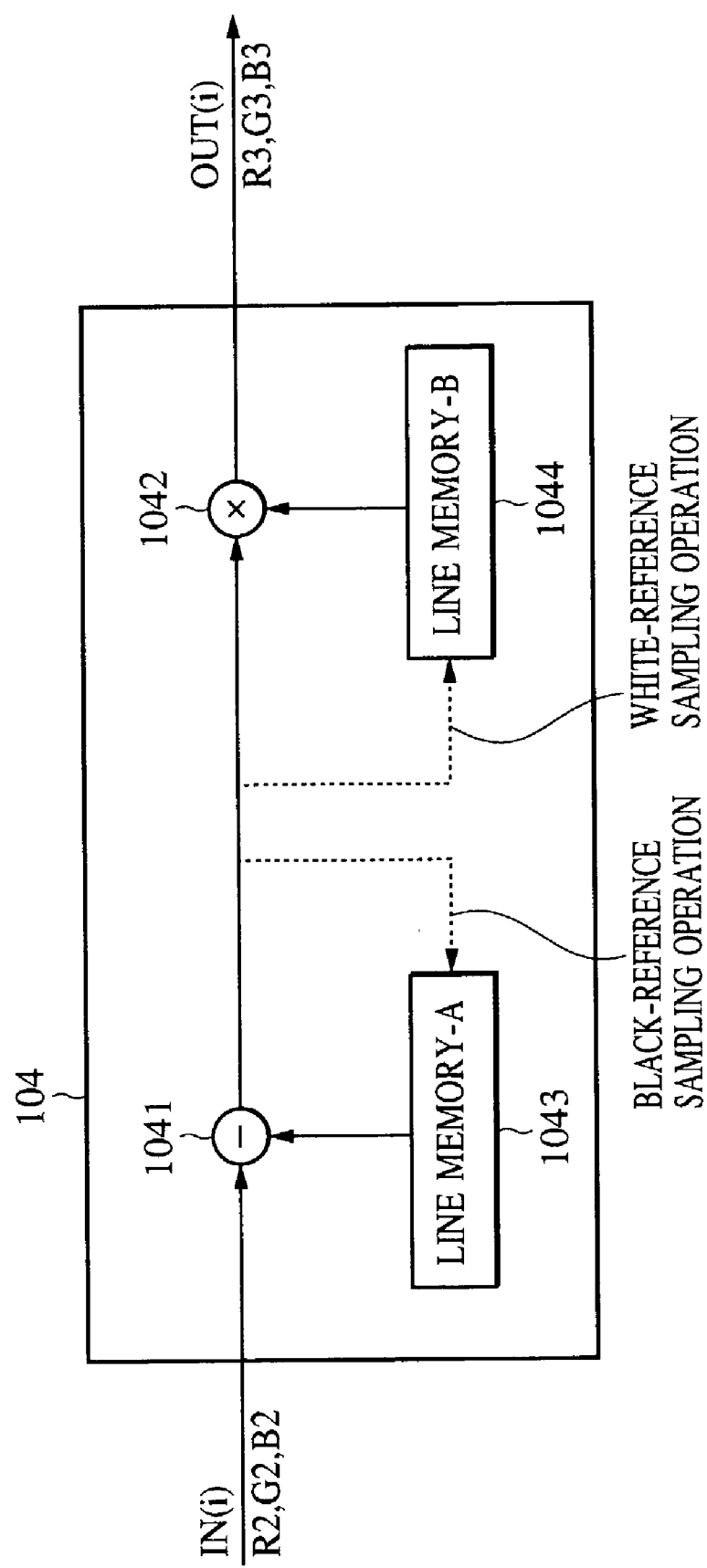
FIG. 7 is a block diagram showing a shading correction unit 104 in the first embodiment of the present invention.
Figure 8:
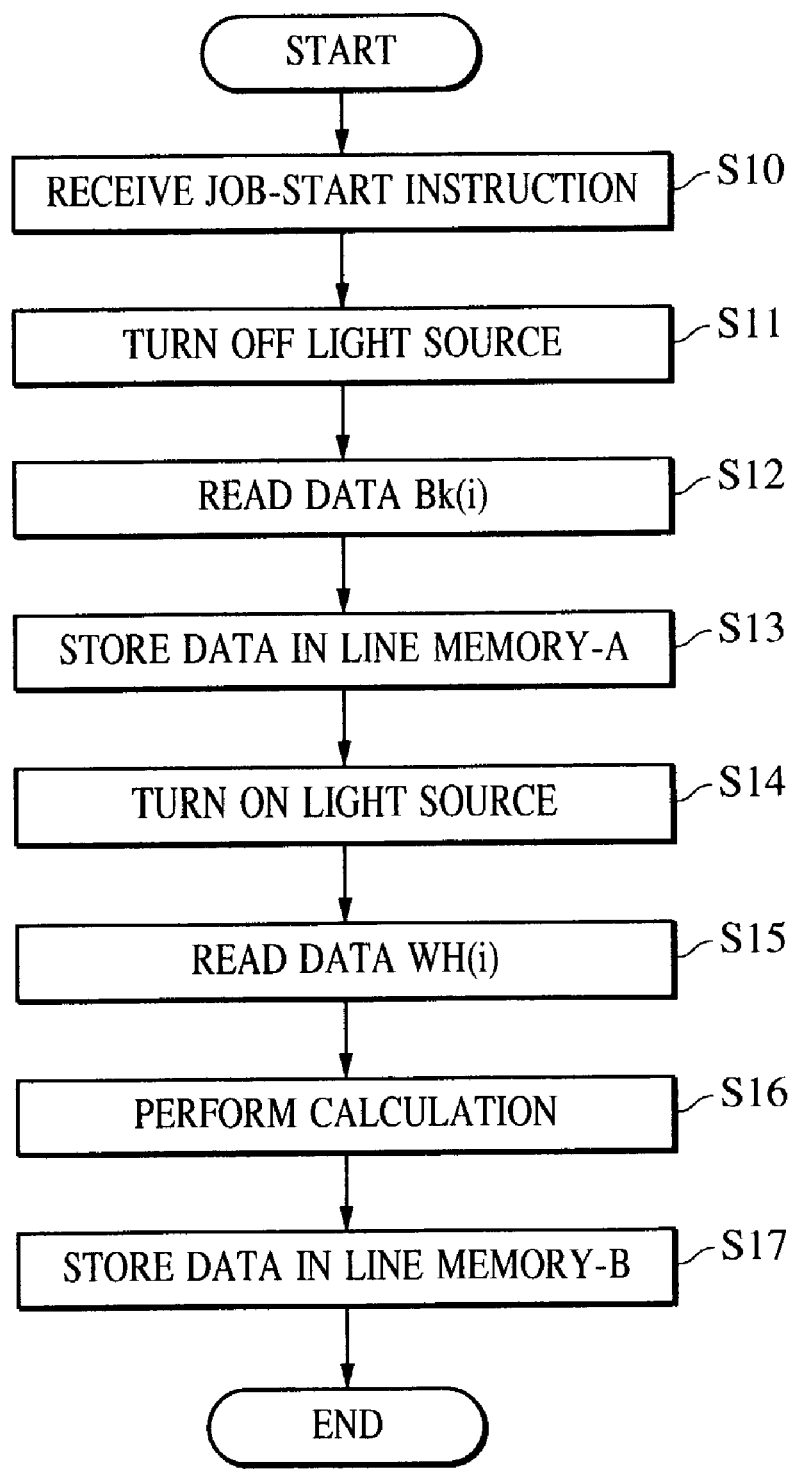
FIG. 8 is a flowchart showing a shading correction process in the first embodiment of the present invention.

FIG. 7 illustrates the shading correction unit 104 that offsets a level difference (e.g., a level difference in a line between image signals obtained when performing reading from the uniform density reference member) between effective image signals. For brevity of description, one of the RGB signals is shown. FIG. 8 shows the operation flow of the shading correction unit 104. The operation flow is controlled by the CPU 108 (FIG. 6) as a control means.

In a data collection operation for performing shading in the first embodiment, when a job for reading an image is received (step S10), the light source is initially turned off (step S11). When the light source is turned off, with light prevented from being incident on the photosensors 2024-1 to 2024-3 in the aperture, a signal Bk(i) as a black reference (black offset level) is read for each pixel (step S12), and is stored for each pixel in a line memory-A 1043 (step S13). The stored signal Bk(i) is a signal level that uses calculation to correct an input signal level to a black-signal reference level.

Next, the light source is turned on in the position of a white reference member as a density reference member (step S14). With the light source turned on, a white-reference signal WH(i) is read for each pixel (step S15).

For the signal WH(i), the following calculation $$1/(WH(i)-Bk(i)) \quad (1)$$

for converting to white-shading correcting data is performed (step S16), and the calculation result is stored in a line memory-B 1044 (step S17). The line memory-A 1043 and the line memory-B 1044 (FIG. 7) may be formed as separate storage media as in the first embodiment, or may be formed as a single storage medium.

When actual image reading is performed, for each effective pixel signal input from the CIS module 202, the following calculation is performed in real time by using data stored in the line memory-A 1043 and the line memory-B 1044, and the calculation result is output as shading-corrected data.

$$OUT(i) = \left(IN(i) - \frac{Bk(i)}{\text{LINE MEMORY-A}}\right) \times \frac{1}{\frac{WH(i)-Bk(i)}{\text{LINE MEMORY-B}}} \quad (2)$$

where the signal IN(i) represents the input signal of the i-th pixel, the signal OUT(i) represents the output signal of the i-th pixel, and the signal Bk(i) represents a black reference (black offset level) for the i-th pixel in the line memory-A 1043. As described above, 1/(WH(i)−Bk(i)) represents white-shading correcting data for the i-th pixel.

The reason that the signal Bk(i) is stored in the line memory-A 1043 is as follows: when a CIS is compared with a reduction optical system, the offset level of each pixel must be corrected because (1) a larger pixel causes black noise, and (2) a plurality of chips have different offset values. Accordingly, the CIS has a feature in requiring a memory sufficient for storing corrected values for pixels. Alternatively, in the case of a CCD in a reduction optical system in which the CCD does not have the above reasons (1) and (2), in black shading, a corrected value for each pixel is not stored, but, for example, it is common that a corrected value for offset correction in units of sensors (for each odd pixel and each even pixel when outputs from pixels in a line are obtained, with the pixels divided into odd pixels and even pixels) is stored and is used to perform shading.

Figure 9:
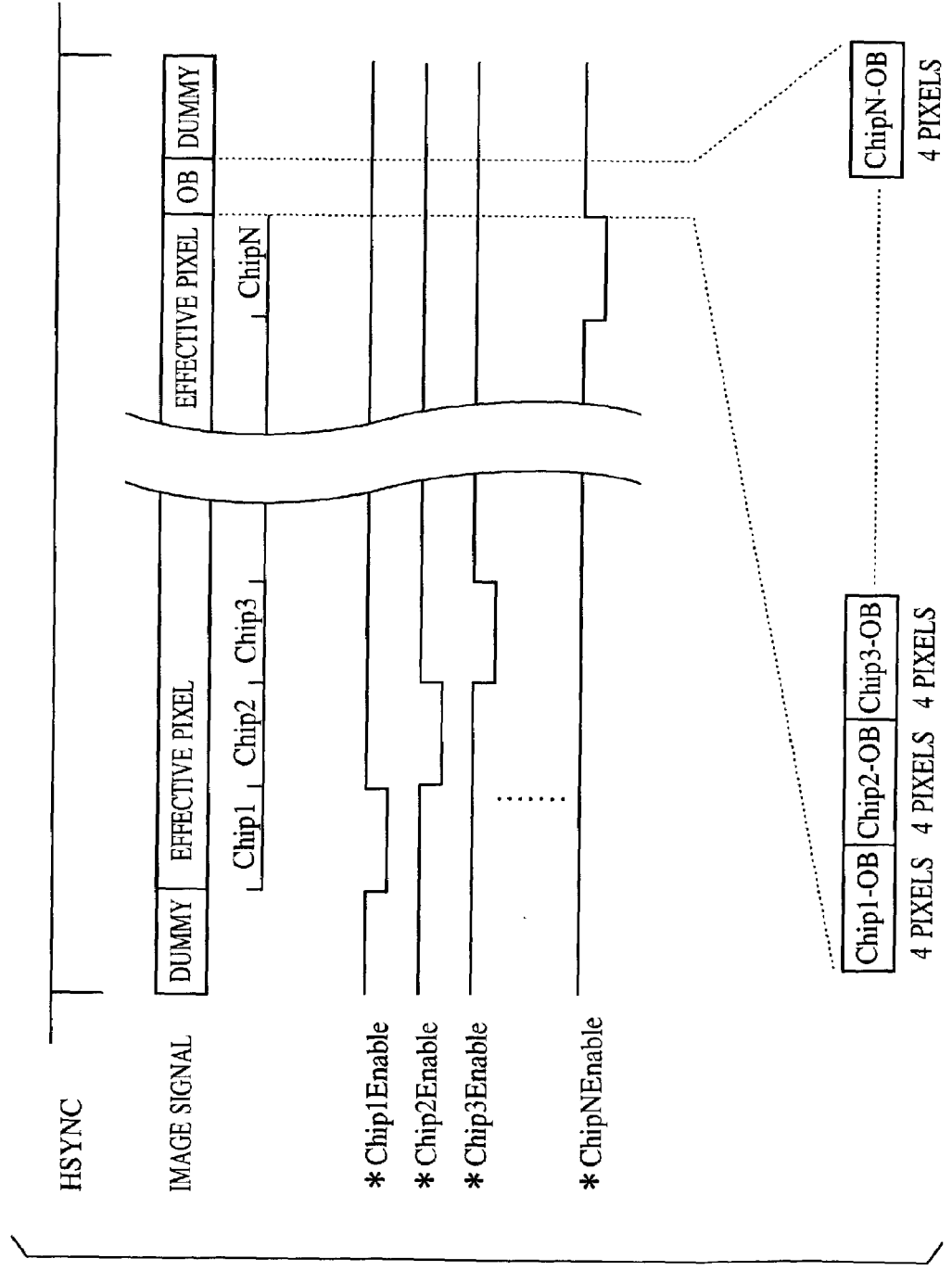
FIG. 9 is a timing chart illustrating signals in the first embodiment of the present invention.

FIG. 9 is a timing chart of signals output from the CIS module 202.

At first, for a certain period of time, a dummy signal is output as an image signal in synchronization with the line synchronizing signal HSYNC. Next, a signal from the effective pixel region is output, and n sensor-chip signals are output from the first chip signal in the order of Chip1, Chip2, ..., ChipN. In the first embodiment, n is less than or equal to 16. Because each sensor chip has 468 pixels, signals are output from (468×16=) 7488 effective pixels. Subsequently, optical-black (OB) pixel signals are output for each set of four pixels in the order of Chip1 (OB), Chip2 (OB), ..., ChipN (OB). After that, a dummy signal is output.

Here, after reference data for shading is acquired, a change in the black offset level obtained at the acquisition must be considered, as described above. Correction on the reference data in consideration of the change in the black offset level in the first embodiment is described in the flowchart shown in FIG. 10. The operations of a black offset monitoring unit 106, the shading correction unit 104, etc., are controlled by the CPU 108.

As described with reference to FIG. 8, output signals as first OB signals from the OB pixel units (light shielding sections) are read beforehand or at the start of a job (e.g., an image reading operation based on an operator's instruction) (step S31, see S10 to S12 in FIG. 8). The black-offset monitoring unit 106 (FIG. 6) observes (monitors) signal levels which are output from OB pixel units for each set of sixteen channels, and stores the first OB signals in a memory 103 (step S32, see S12 in FIG. 8). Next, the CIS module 202 is used to read the image of the document as a subject (step S33). In step S34, it is determined whether or not the next document is detected. When no document is detected, the image reading operation is terminated. When the next document is detected, the process proceeds to step S35. The black-offset monitoring unit 106 monitors output signals from the OB pixel units again (step S35).

Then, the CPU 108 compares the output signal from the OB pixel unit of each chip with the first OB signal (step S36). Specifically, the CPU 108 compares the output signal from the OB pixel unit of each chip with the first OB signal and calculates a first difference signal Δm representing the difference between both signals. The CPU 108 also compares first difference signals Δm between output signals from the OB pixel units of adjacent chips, and calculates a second difference signal Dn representing the difference between both first difference signals.

In other words, the black-offset monitoring unit 106 combines with the memory 103 (FIG. 6) to have a function of storing the output signals from the OB pixels. The CPU 108 uses the black-offset monitoring unit 106 to access the data stored in the memory 103, and calculates the first difference signal Δm based on the following expression:

$$\text{Chip1}(OB(0)) - \text{Chip1}(OB(k)) = \Delta m$$

where Chip1 (OB(0)) is an output signal from the OB pixel unit of Chip1, Chip1 (OB(k)) is an output signal from the OB pixel unit of Chip1 which is read in the k-th scan during a job, and Δm is a first difference signal representing the difference between both output signals. Similarly, calculations for first difference signal Δm=Δ2, Δ3, . . . , ΔN (N represents the number of channels and is 16 in the first embodiment) are performed. Based on the result, the CPU 108 performs the following calculation:

$$\Delta 1 - \Delta 2 = Dn$$

The second difference signal Dn represents a difference, as described above, and similarly, calculations for the second difference signal Dn=D2, D3, . . . , DN−1 (N represents the number of channels and is 16 in the first embodiment) are performed.

In step S37, the CPU 108 determines whether, for example, at least four second difference signals Dn exceeding a threshold value Th (here, 2 on 8 bits (256)) are detected on a second difference signal Dj. If a second difference signal Dj exceeding the threshold value Th is not detected, a counter value (CNT) is set to zero and the CPU 108 proceeds to step S33.

If Dm exceeding the threshold value Th is detected, one is added to the counter value, and the CPU 108 proceeds to step S38. The CPU 108 determines whether the counter value exceeds a predetermined value K (5 in the first embodiment). If the counter value does not exceed the predetermined value K, the CPU 108 proceeds to step S33. If the counter value exceeds the predetermined value K, the CPU 108 proceeds to step S39.

When the counter value exceeds the predetermined value, individual differences cause non-uniform changes in the black offset level among a plurality of sensor chips. Thus, a plurality of channels have different reference levels for the black signal, and in the image region corresponding to each reference level, a brightness difference is generated, so that there is a high possibility of image deterioration in visual quality. For example, when it takes three minutes from the first to the fiftieth document in consecutive reading of fifty documents set on the ADF 203, the black offset level may greatly change between the reading of the first document and the reading of the fiftieth document, as described above.

In particular, if the CPU 108 has determined in step S37 that the second difference signal does not reach the threshold value Th, the counter value is set to zero. Thus, when the output signal for shading is acquired again, the second difference signal Dn should consecutively reach the threshold value Th. In other words, the output signal reacquisition uses five documents, and it is therefore estimated that nonuniform level differences among chips are very large.

Accordingly, the CIS module 202 is moved to a position in which it can read an image on the standard white member 206 (step S39). After the CIS module 202 is moved, the process for sampling data for shading correction is executed again (step S40). In other words, the process shown in FIG. 8 is performed again. After that, the CIS module 202 is moved to a predetermined position (step S43) (not shown), a process for reading the next image is performed.

The outline of the sequence shown in the flowcharts is as follows:

when, as a result of the comparison with an output signal from the OB pixel unit which is read beforehand or at the start of a job, at least four signals from the OB pixel units are detected which have differences of at least two levels on 8 bits (0 to 255), and which are generated in the reading of five documents, it is determined that re-reading of data for shading correction is required. When it is determined that the re-reading of data for shading correction is required, the re-reading of data for shading correction is performed. Reading of the image of a document as the next subject image is continuously performed. This enables the black-offset level difference between adjacent chips to be within a predetermined range when it is compared with an initial value for shading correction which is read beforehand or at the start of the job.

Even when reflected images from (several tens of) documents 204-1 are read for several minutes, the offset change in the black level can be suppressed to the initial state of the job, that is, a shift in the sensor's reference signal in units of lines can be suppressed to be within a predetermined range with respect to a reference signal obtained just after initial shading correction.

In particular, the above is effective in a case in which sensors which consist of a plurality of chips and which output signals for a plurality of channels are used. This is because, in such a case, lines caused by reference signal differences appear on the read image since different time-lapse offset-level changes occur for chips, so that the channels have different effective-signal reference levels. In the first embodiment, the lines on the read image can be efficiently reduced.

Specifically, by performing the above processing, the non-uniformity between adjacent chips is monitored and can be controlled so as not to exceed a predetermined value. Accordingly, preferable image reading can be performed, even if the black level change among a plurality of chips is not uniform. In other words, the present invention can cope with a problem of a large deterioration in visual quality caused by brightness differences in image regions of the read image which correspond to a plurality of chips.

In the first embodiment, re-reading of shading data is performed during the time between the reading of one document and the reading of the next document. There is the time between reading of one document as a subject and reading of the next document as a subject, and the time is used. Therefore, although the first embodiment performs the re-reading by using the time between the reading of one document and reading of the next document, the re-reading time is not limited thereto, but may be set to a predetermined time. However, the predetermined time may influence the image reading speed.

Figure 10:
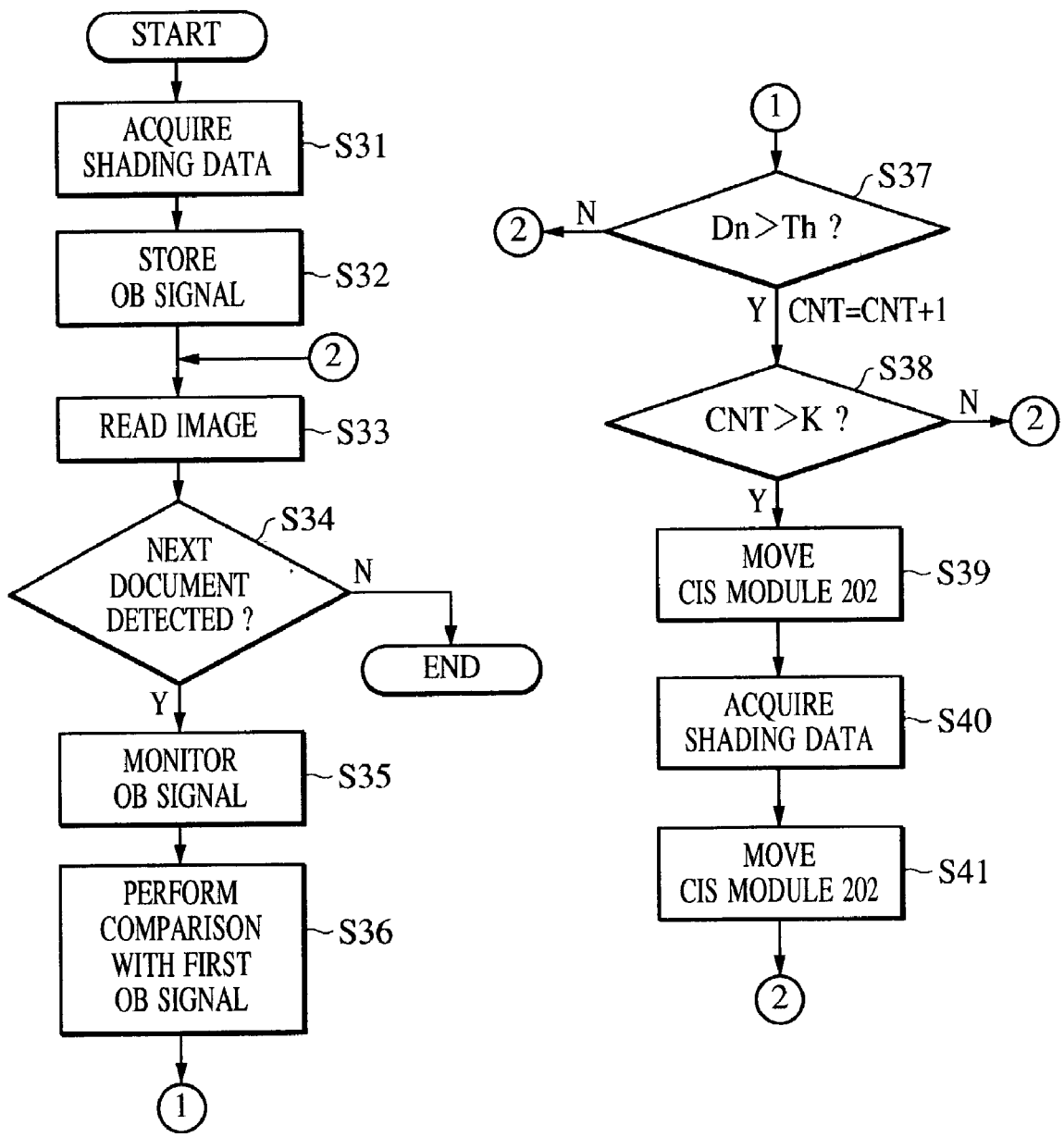
FIG. 10 is a flowchart illustrating correction by shading of a change in black reference level in the first embodiment of the present invention.

The technique in the first embodiment is effective particularly when the light source 2022 (FIG. 2) is turned on in step S35 in FIG. 10. The reason is that, since charges are stored in photodiodes in the effective regions when the light source 2022 is turned on, black offset level signals from the corresponding pixels cannot be detected.

Figure 11:
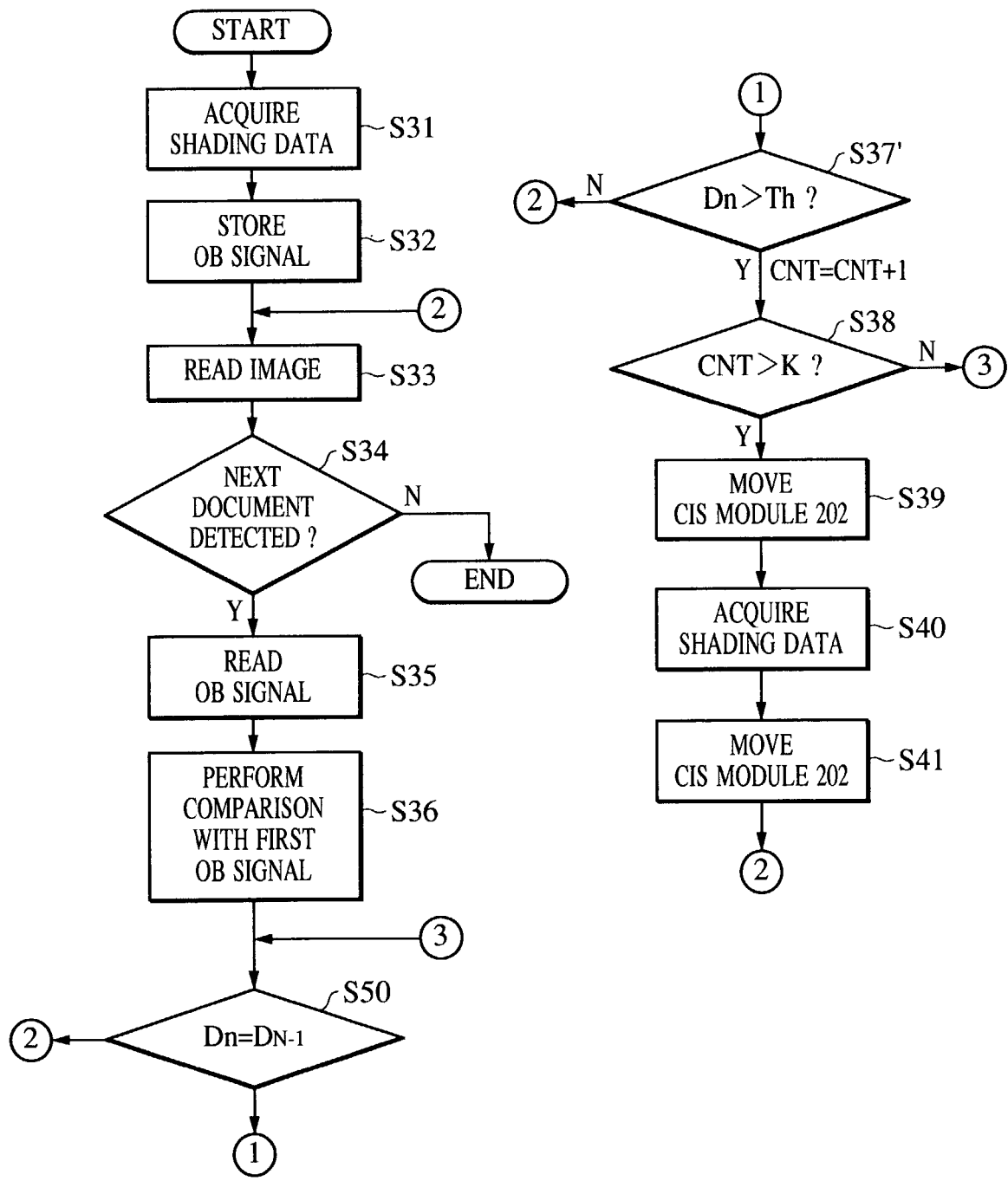
FIG. 11 is a flowchart illustrating correction by other shading of a change in black reference level in the first embodiment of the present invention.

Although the first embodiment is described with reference to the flowchart in FIG. 10, it is not limited thereto, but may be described with reference to the flowchart shown in FIG. 11. In FIG. 11, by denoting steps identical to those in FIG.

10 by using identical reference numerals, the description thereof is omitted. In the flowchart in FIG. 11, step S50 is inserted before step S37 described in FIG. 10. Specifically, in the flowchart in FIG. 10, when at least four second difference signals Dn exceeding the predetermined threshold value are detected, one is added to the counter value (step S38). The flowchart in FIG. 11 differs in the following points. At first, each of the second difference signals Dn (n=1 to N−1) is sequentially compared with the predetermined threshold value Th from D1. When the second difference signal Dn exceeds the threshold value Th, one is added to the counter value, and the CPU 108 determines whether the counter value is greater than predetermined value K (step S38). When the counter value is greater than predetermined value K, the CIS module 202 is moved (step S39), and the above-described processing is performed. Alternatively, when the counter value is less than predetermined value K, the next second difference signal Dn−1 is compared with the threshold value Th (step S37'). When it is determined that comparison with the threshold value Th of the second difference signals D1 to Dn−1 is completed (step S50), reading of the image of a document as the next subject is performed (step S33).

In the outline of the sequence shown in the flowchart in FIG. 10, when a difference of at least two levels on 8 bits (0 to 255) occurs among five chips, it is determined that re-reading of data for shading correction is required. This makes it possible to control the black-offset-level difference between adjacent chips to be within a predetermined range by performing comparison with the initial value for shading correction which is read beforehand or at the start of the job.

In the flowchart in FIG. 11, the non-uniformity for each time between the reading of one document and the reading of the next document is monitored and can be controlled so as not to exceed a predetermined value. Compared therewith, the flowchart in FIG. 10 will provide good image-output (image-input) productivity. Also, when the output signal for shading is acquired again, the second difference signals Dn should consecutively reach the threshold value Th. Thus, error can be reduced.

The CIS module 202 has three line sensors (2024-1 to 2024-3 as shown in FIG. 4) corresponding to RGB. However, even one line sensor composed of a plurality of chips is effective for the technology described in the first embodiment.

In the first embodiment, the first OB signal is fixed as a signal acquired at the start of a job. However, in the case of using an acquired signal as the first OB signal, even if the initial value acquired at the start of the job has some problem, response to such a situation is possible. However, when the signal acquired at the start of the job is fixed as the first OB signal, faithful determination of data for shading correction can be performed because the fixed signal corresponds to data for shading correction at the start of the job.

Second Embodiment

A second embodiment of the present invention in which an image reading apparatus of the present invention is applied to a sheet-feeding apparatus is described with reference to FIG. 12.

Figure 12:
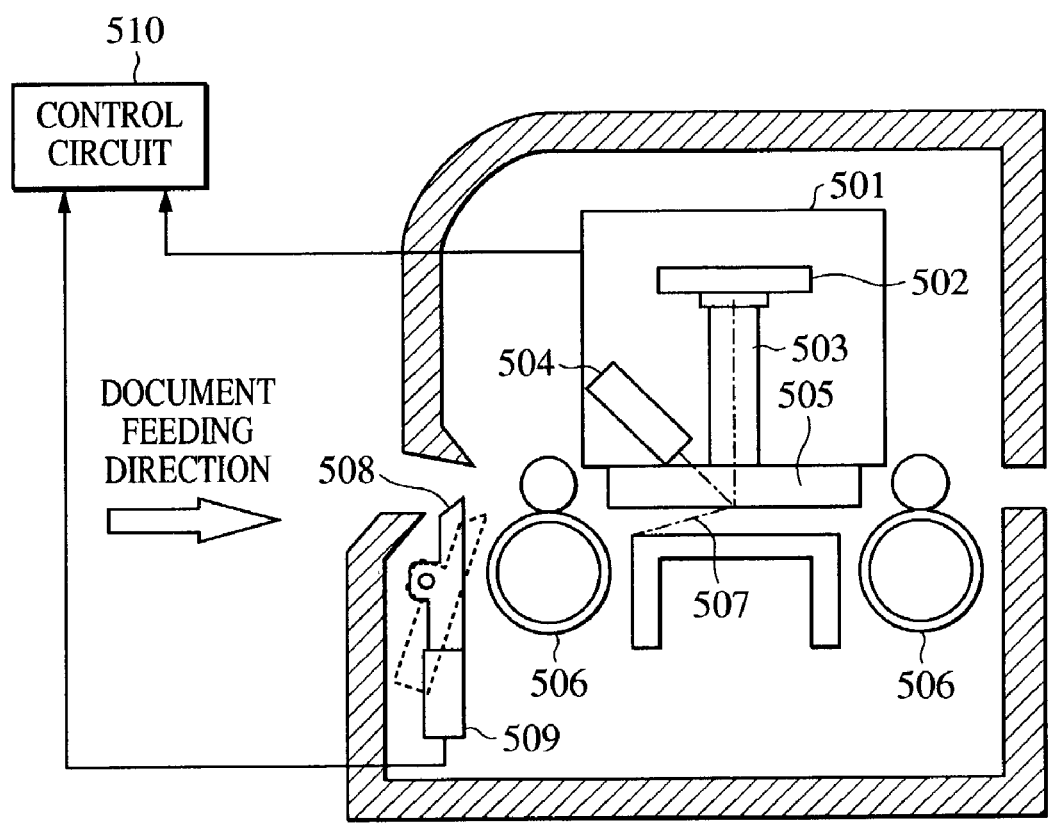
FIG. 12 is an image reading apparatus of a sheet-feeding type according to a second embodiment of the present invention.

FIG. 12 shows the outline of a document-image reading apparatus according to the second embodiment of the present invention.

A CIS 501 includes a charge-coupled device 502, a selfoc lens 503, an LED array 504, and a contact glass 505.

Carrying rollers 506 are provided before and after the CIS 501 and are used to dispose a document. A contact sheet 507 is used to bring the document into contact with the CIS 501. A control circuit 510 processes a signal from the CIS 501 and has control functions similar to those of the CPU 108 in the first embodiment.

A document detecting lever 508 is used to detect insertion of the document. When the document detecting lever 508 detects the insertion, it inclines to change the output of a document detecting sensor 509. The state is transmitted to a CPU in the control circuit 510, and the CPU determines that the document is inserted, and initiates document carriage to perform reading of the document by driving a motor (not shown) for driving the carrying rollers 506.

Also, in the second embodiment having the above construction, advantages similar to those in the first embodiment can be obtained.

As described above, according to the present invention, by efficiently suppressing a time-lapse change in a reference signal which is associated with thermal change, good image reading can be performed.

Other Embodiments

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the present invention.

Further the storage medium, such as a floppy disk, a hard disk, an optical disk, a magneto-optical disk, a CD-ROM, a CD-RAM, a magnetic tape, a non-volatile type memory card, and a ROM can be used for providing the program codes.

Furthermore, beside the aforesaid functions according to the above embodiments are realized by executing the program codes which are read by a computer, the present invention includes a case where an OS (operating system) or the like working on the computer performs the entire or part of the processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, the CPU or the like contained in the function expansion card or unit performs the entire or part of the processes in accordance with designations of the program codes and realizes functions of the above embodiments.

In a case where the present invention is applied to the aforesaid storage medium, the storage medium stores program codes corresponding to the flowchart in FIG. 3, 4, or 5 which is described in the embodiments.

The present invention is not limited to the above embodiments, and various changes and modifications can be made within the spirit and scope of the present invention. Therefore, to apprise the public of the scope of the present invention, the following claims are made.

What is claimed is:

1. An image reading apparatus comprising:
   an imaging unit having a plurality of channels, comprising photo-receiving sections and light-shielding sections, said imaging unit outputting effective signals from said photo-receiving sections and outputting optical black signals from said light-shielding sections;
   a signal correction unit which corrects the effective signals for the channels; and
   a controller which reads output optical black signals from said light-shielding sections at first and second times and controls said imaging unit to output, with predetermined timing, the signals for correction by said signal correcting unit,
   wherein the predetermined timing is the time that a predetermined value is reached by a level difference for each of the channels between a first optical black signal output for each of the channels from said light-shielding section at the first time and a second optical black signal for each of the channels from said light-shielding section at the second time output after the first optical black signal is output.

2. An image reading apparatus according to claim 1, wherein, in response to a reception of a job-start signal, said controller controls said imaging unit to output the signals for correction by said signal correcting unit.

3. An image reading apparatus according to claim 1, wherein said correcting unit performs shading correction.

4. An image reading apparatus according to claim 1, wherein said signal correcting unit performs the correction so that a signal level difference between channels decreases.

5. An image reading apparatus according to claim 1, wherein the signals for correction by said signal correcting unit are corrected on offset level.

6. An image reading apparatus according to claim 1, wherein the signals for correction by said signal correcting unit are output from said photo-receiving sections, with the light prevented from being incident on said photo-receiving sections.

7. An image reading apparatus according to claim 1, further comprising a light source for emitting light onto a document, wherein said light source is turned off when the signals are output from said imaging unit so as to be corrected by said signal correcting unit.

8. An image reading apparatus according to claim 1, further comprising:
   a light source which emits light onto a document; and
   a density-reference member,
   wherein, when the signals are output from said imaging unit so as to be corrected by said signal correcting unit, said light source emits light onto said density-reference member.

9. An image reading apparatus according to claim 1, wherein, when a level difference for each of the channels between the second optical black signal and the first optical black signal reaches a predetermined value between adjacent channels, said controller controls said imaging unit to output the signals for correction by said signal correcting unit.

10. An image reading apparatus according to claim 1, further comprising a moving unit which relatively moves said imaging unit and each of documents, wherein said imaging unit reads the image of each of a shielded one of the documents, and based on the second optical black signal output from said light-shielding section, said controller controls said imaging unit to output the signals for correction by said signal correcting unit between a reading of one document and a reading of another document.

11. An image reading apparatus according to claim 1, wherein said imaging unit comprises a plurality of chips, and the channels correspond to the chips, respectively.

12. An image reading apparatus according to claim 1, wherein each of the chips has a said photo-receiving section and a said light-shielding section.

13. An image reading system comprising:
   an image reading apparatus; and
   a signal processing unit which performs signal processing on an input signal which is output from said image reading apparatus,
   wherein:
   said image reading apparatus comprises:
      an imaging unit which has a plurality of channels comprising photo-receiving sections and light-shielding sections and which outputs effective signals from said photo-receiving sections and outputs optical black signals from said light-shielding sections;
      a signal correcting unit which corrects the effective signals for the channels; and
      a controller which reads output optical black signals from said light-shielding sections at first and second times and controls said imaging unit to output, with predetermined timing, the signals for correction by said signal correcting unit;
   wherein the predetermined timing is the time that a predetermined value is reached by a level difference for each of the channels between a first optical black signal output for each of the channels from said light-shielding section at a first time and a second optical black signal for each of the channels from said light-shielding section at the second time output after the first optical black signal is output.

14. An image reading method with the use of an image reading apparatus comprising: an imaging unit which has a plurality of channels comprising photo-receiving sections and light-shielding sections and which outputs effective signals from the photo-receiving sections and outputs optical black signals output from the light-shielding sections; a signal correcting unit which corrects the effective signals for the channels; and a controller which reads output optical black signals from said light-shielding sections at first and second times and controls said imaging unit to output, with predetermined timing, the signals for correction by said signal correcting unit, said method comprising the steps of:
   outputting the second optical black signal at the second time from at least one of the channels from a light shielding section thereof after the first optical black signal is output at the first time from the same at least one of the channels from the same light shielding section thereof; and
   outputting a signal from said imaging unit with timing which is the time that a predetermined valued is reached by a level difference for the one of the channels between the first optical black signal output for the one of the channels from the light-shielding section thereof at a first time and the second optical black signal for the one of the channels from the light-shielding section thereof at the second time output after the first optical black signal is output.

15. An image reading method according to claim 14, wherein the signals for correction are output from said imaging unit in response to a reception of a job-start signal.

16. An image reading method according to claim 14, wherein said signal correcting unit performs shading correction.

17. An image reading method according to claim 14, wherein said signal correcting unit performs correction so that a signal-level difference between channels decreases.

18. An image reading method according to claim 14, wherein the signals for correction by said signal correcting unit are corrected on offset level.

19. An image reading method according to claim 14, wherein the signal for corrections by said signal correcting unit which are output from said imaging unit are output from said photo-receiving section, with light prevented from being incident on said photo-receiving section.

20. An image reading method according to claim 19, wherein said image reading apparatus further comprises a light source for emitting light onto a document, and the signals for correction by said signal correcting unit which are output from said imaging unit are output from said photo-receiving sections when said light source is turned off.

21. An image reading method according to claim 14, wherein said image reading apparatus further comprises a light source for emitting light onto a document, and a density-reference member, and when the signals are output from said imaging unit so as to be corrected by said signal correcting unit, said light source emits light onto said density-reference member.

22. An image reading method according to claim 14, wherein, when a level difference for each of the channels between the second optical black signal and the first optical black signal is greater than a predetermined value between adjacent channels, the signals for correction by said signal correcting unit are output from said imaging unit.

23. An image reading method according to claim 14, wherein:
said image reading apparatus further comprises a moving unit for relatively moving the said imaging unit and each of the selected one of documents; and
said imaging unit reads the image of each of the documents, and, based on the second optical black signal output from said light-shielding section, outputs the signals for correction by said signal correcting unit between a reading of one document and a reading of another document.

24. An image reading method according to claim 14, wherein said imaging unit comprises a plurality of chips, and the channels correspond to the chips, respectively.

25. An image reading method according to claim 14, wherein each of the chips has the photo-receiving section and the light-shielding section.

26. A computer program product comprising a computer-usable medium having computer-readable program-code means embodied in said computer-usable medium for controlling an image reading apparatus comprising: an imaging unit which has a plurality of channels comprising photo-receiving sections and light-shielding sections and which outputs effective signals from the photo-receiving sections and outputs optical black signals from the light-shielding sections; a signal correcting unit which corrects the effective signals for the channels; and a controller which reads output optical black signals from said light-shielding sections at first and second times and controls said imaging unit to output, with predetermined timing, the signals for correction by said signal correcting unit, said computer program product including computer-readable program-code means for causing said imaging unit to output the signals for correction with timing which is the time that a predetermined value is reached by a level difference for each of the channels between a first optical black signal output for each of the channels from said light-shielding section at the first time and a second optical black signal for each of the channels from said light-shielding section at the second time output after the first optical black signal is output.

* * * * *

UNITED STATES PATENT AND TRADEMARK OFFICE
CERTIFICATE OF CORRECTION

| | | |
|---|---|---|
| PATENT NO. | : 7,236,265 B2 | Page 1 of 1 |
| APPLICATION NO. | : 10/285468 | |
| DATED | : June 26, 2007 | |
| INVENTOR(S) | : Kenji Hiromatsu | |

It is certified that error appears in the above-identified patent and that said Letters Patent is hereby corrected as shown below:

COLUMN 1:

Line 29, "(offsets)" should read --(offset)--; and
    Line 46, "one" should be deleted.

COLUMN 3:

Line 5, "output" should read --outputs--;
    Line 6, "output" should read --outputs--;
    Line 24, "output" should read --outputs--;
    Line 25, "output" should read --outputs--;
    Line 41, "output" should read --outputs--; and
    Line 42, "output" should read --outputs--.

COLUMN 10:

Line 24, "job, that" should read --job; that--.

COLUMN 12:

Line 45, "beside" should read --besides that--.

COLUMN 14:

Line 57, "valued" should read --value--.

Signed and Sealed this

Seventh Day of October, 2008

JON W. DUDAS
*Director of the United States Patent and Trademark Office*